No. 750,215. PATENTED JAN. 19, 1904.
A. McENTEE.
STEERING GEAR FOR WAGONS.
APPLICATION FILED JUNE 2, 1903.
NO MODEL.

WITNESSES
Walter Allen
James M. Shea

INVENTOR
Amby McEntee
by Herbert W. T. Jenner
Attorney

No. 750,215. Patented January 19, 1904.

UNITED STATES PATENT OFFICE.

AMBY McENTEE, OF SOUTH PRESQUE ISLE, MAINE.

STEERING-GEAR FOR WAGONS.

SPECIFICATION forming part of Letters Patent No. 750,215, dated January 19, 1904.

Application filed June 2, 1903. Serial No. 159,823. (No model.)

*To all whom it may concern:*

Be it known that I, AMBY McENTEE, a British subject, residing at South Presque Isle, in the county of Aroostook and State of Maine, have invented certain new and useful Improvements in Steering-Gear for Wagons; and I do hereby declare the following to be a full, clear, and exact description of the invention, such as will enable others skilled in the art to which it appertains to make and use the same.

This invention relates to steering-gear for wagons, and more particularly to wagons having low frames and adapted for carrying heavy weights; and it consists in the novel construction and combination of the parts hereinafter fully described and claimed.

Figure 1:
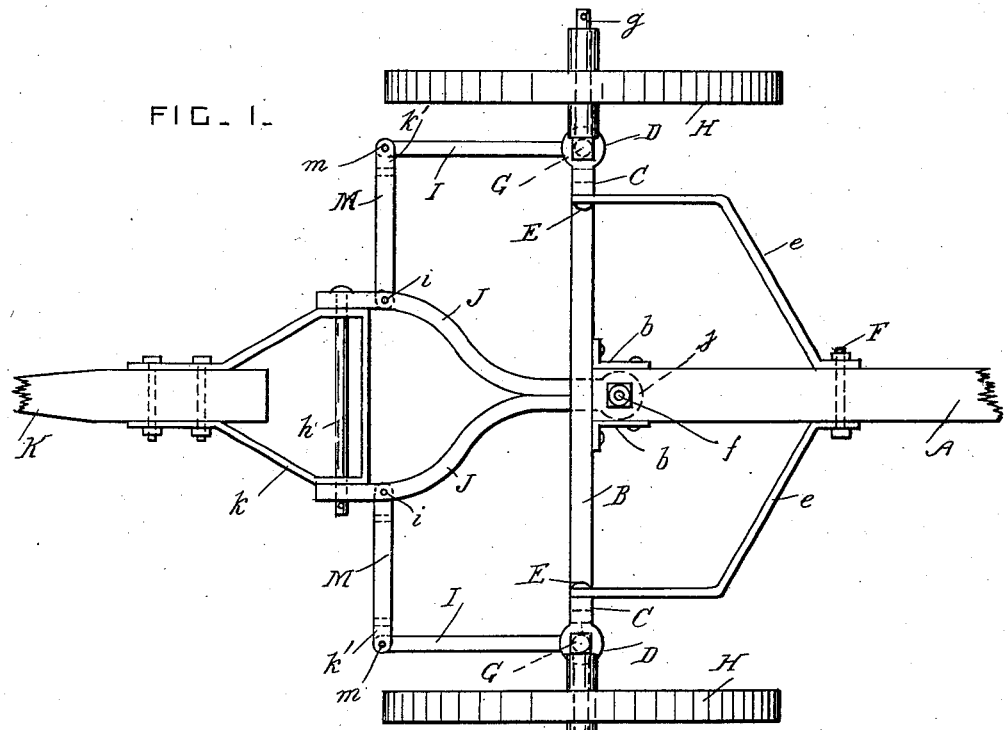
Figure 2:
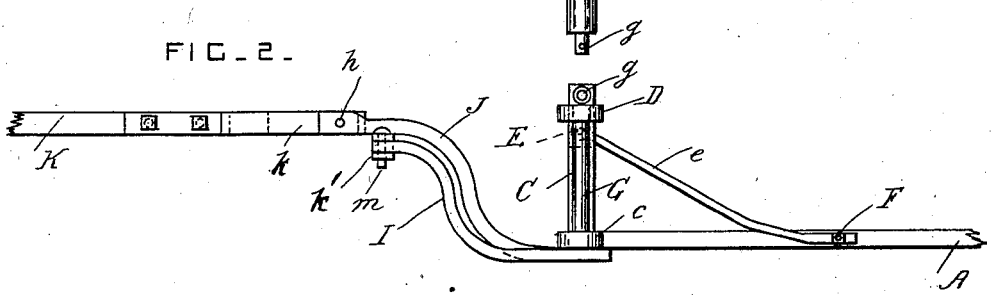
Figure 3:
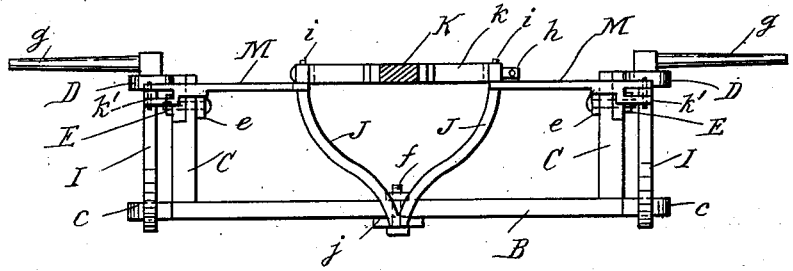

In the drawings, Figure 1 is a plan view of the steering-gear. Fig. 2 is a side view. Fig. 3 is a front end view.

A is a reach-bar or tongue which is secured to the under side of the frame or platform of the wagon, which is of any approved construction.

B is a cross-bar secured to the front end of the reach-bar by the brackets $b$ and having vertical pillars C at its end and bearings $c$, which project at the lower parts of the pillars.

D represents bearings which are secured to the upper ends of the pillars C over the bearings $c$.

E represents bolts which secure the bearings D in position, and $e$ represents braces secured to the said pillars by the bolts E at one end and having their other ends secured to the reach-bar by a bolt F.

G represents two vertical shafts which are journaled in the bearings D and $c$, and $g$ represents axle-bearings which project from the upper ends of the shafts G above the bearings D.

H represents the front wheels, which are journaled on the said axle-bearings.

I represents upwardly-curved arms secured to the lower ends of the shafts G below the bearings $c$.

J represents two upwardly-curved and diverging arms, which have their rear ends provided with an eye $j$, which is pivoted to the front end portion of the reach-bar by a pin or bolt $f$.

K is the draft-pole, provided with a frame $k$ at its rear end, which is pivoted between the front ends of the arms J by a pin or bolt $h$, so as to be free to move vertically.

M represents connecting rods or bars pivoted at one end to the end portions of the inner arms J by pins $i$ and having double eyes $k'$ at their other ends, which are pivoted to the front ends of the outer arms I by pins or bolts $m$.

When the draft-pole is moved laterally, the axle-bearings are moved out of line, so as to permit the wagon to change its direction of travel and to turn around in a short space.

What I claim is—

1. The combination, with a wagon reach-bar, and a cross-bar secured to its front end, said cross-bar having upwardly-projecting pillars and two bearings D and $c$ at its ends; of vertical shafts journaled in the said bearings and provided with axle-bearings above the said bearings D at their upper ends, outer arms secured below the said bearings $c$ to the lower ends of the said shafts, inner arms having their rear ends pivoted to the said reach-bar, a draft-pole connected to the front ends of the said inner arms, and connecting-rods pivoted to the said inner and outer arms at each side of the draft-pole.

2. The combination, with a wagon reach-bar, and a cross-bar secured to its front end, said cross-bar having upwardly-projecting pillars and two bearings D and $c$ at its ends; of brace-rods secured between the said reach-bar and the upper parts of the said pillars, vertical shafts journaled in the said bearings and provided with axle-bearings above the said bearings D at their upper ends, upwardly-curved outer arms secured below the said bearings $c$ to the lower ends of the said shafts, upwardly-curved and diverging inner arms having their rear ends pivoted to the said reach-bar, a draft-pole pivoted between the front ends of the said inner arms, and connecting-rods pivoted to the said inner and outer arms at each side of the draft-pole.

In testimony whereof I affix my signature in presence of two witnesses.

AMBY McENTEE.

Witnesses:
 CHARLES F. DAGGETT,
 ARTHUR C. PERRY.